United States Patent
Bowen

(10) Patent No.: US 6,427,547 B1
(45) Date of Patent: Aug. 6, 2002

(54) DUAL-COUNTERSHAFT TWIN-CLUTCH AUTOMATED TRANSMISSION WITH BI-DIRECTIONAL CLUTCHES

(75) Inventor: Thomas C. Bowen, Rochester Hills, MI (US)

(73) Assignee: New Venture Gear, Inc., Troy, MI (US)

( * ) Notice: Subject to any disclaimer, the term of this patent is extended or adjusted under 35 U.S.C. 154(b) by 11 days.

(21) Appl. No.: 09/779,181

(22) Filed: Feb. 8, 2001

(51) Int. Cl.$^7$ .............................. F16H 3/08; F16D 41/04
(52) U.S. Cl. .............................. 74/329; 74/331; 74/333; 192/48.9
(58) Field of Search ........................... 74/329–331, 333, 74/336 R, 730.1; 192/41 R, 45, 48.1, 48.92

(56) References Cited

U.S. PATENT DOCUMENTS

| | | | | |
|---|---|---|---|---|
| 4,566,348 A | * | 1/1986 | Akashi et al. ................. | 74/359 |
| 5,347,879 A | * | 9/1994 | Ordo ............................ | 74/331 |
| 5,720,203 A | * | 2/1998 | Honda et al. | |
| 6,209,406 B1 | | 4/2001 | Sperber et al. ............... | 74/330 |
| 6,209,407 B1 | | 4/2001 | Sperber et al. ............... | 74/331 |

FOREIGN PATENT DOCUMENTS

EP 0088186 * 9/1983 ................. 74/359

* cited by examiner

Primary Examiner—Sherry Estremsky
Assistant Examiner—Tisha D. Lewis
(74) Attorney, Agent, or Firm—Harness, Dickey & Pierce P.L.C.

(57) ABSTRACT

An automated dual-countershaft twin-clutch multi-speed transmission adapted to transfer power from the engine to a driveline of a motor vehicle. The transmission includes a first master clutch operable to establish a releasable drive connection between the input shaft and a first countershaft, a second master clutch operable to establish a releasable drive connection between the input driveline, and a geartrain for selectively establishing a plurality of forward and reverse speed ratio drive connections between the countershafts and the output shaft. The transmission further includes power-operated shiftable overrunning clutches for selectively engaging constant-mesh gearsets associated with the geartrain, and a transmission controller for controlling coordinated actuation of the first and second master clutches, and the shiftable overrunning clutches to permit non-power interrupted ("powershift") sequential gear changes automatically without input from the vehicle operator.

17 Claims, 3 Drawing Sheets

DUAL-COUNTERSHAFT TWIN-CLUTCH AUTOMATED TRANSMISSION WITH BI-DIRECTIONAL CLUTCHES

FIELD OF THE INVENTION

The present invention relates generally to transmissions for use in motor vehicles and, more particularly, to a twin-clutch automated transmission applicable for use in rear-wheel drive vehicles.

BACKGROUND OF THE INVENTION

Automobile manufacturers continuously strive to improve fuel efficiency. This effort to improve fuel efficiency, however, is typically offset by the need to provide enhanced comfort and convenience to the vehicle operator. For example, it is well known that manual transmissions are more fuel efficient than automatic transmissions, yet a majority of all passenger vehicles are equipped with automatic transmissions due to the increased convenience they provide.

More recently, "automated" variants of conventional manual transmissions have been developed which shift automatically without any input from the vehicle operator. Such automated transmissions typically include a plurality of power-operated actuators that are controlled by a transmission controller to shift traditional synchronized dog clutches. However, such automated transmissions have the disadvantage that there is a power interruption in the drive connection between the input shaft and the output shaft during sequential gear shifting. Power interrupted shifting results in a harsh shift feel which is generally considered to be unacceptable when compared to smooth shift feel associated with most automatic transmissions. To overcome this problem, automated twin-clutch transmissions have been developed which can be powershifted to permit gearshifts to be made under load. Examples of such automated manual transmissions are shown in U.S. Pat. Nos. 5,966,989 and 5,890,392. While such powershift twin-clutch transmissions overcome several drawbacks associated with conventional single-clutch automated transmissions, a need exists to develop simpler and more robust transmissions which advance the automotive transmission technology.

SUMMARY OF THE INVENTION

Accordingly, it is an object of the present invention to provide a dual-countershaft twin-clutch transmission and a control system for permitting automatic shifting of transmission.

As a related object, the twin-clutch automated transmission of the present invention has a compact geartrain and is applicable for use in rear-wheel drive vehicles.

These and other objects of the present invention are met by providing an automated dual-countershaft twin-clutch multi-speed transmission adapted to transfer power from the engine to a driveline of a motor vehicle. The transmission includes a first master clutch operable to establish a releasable drive connection between the input shaft and a first countershaft, a second master clutch operable to establish a releasable drive connection between the input shaft and a second countershaft, an output shaft adapted to transfer power to the driveline, and a geartrain for selectively establishing a plurality of forward and reverse speed ratio drive connections between the countershafts and the output shaft. The transmission further includes overrunning clutches shiftable between locked and released modes for selectively engaging constant-mesh gearsets associated with the geartrain, and a transmission controller for controlling coordinated actuation of the first and second master clutches, and shifting of the overrunning clutches to permit non-power interrupted ("powershift") sequential gear changes automatically without input from the vehicle operator.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the scope of this invention will become apparent to those skilled in the art.

DETAILED DESCRIPTION OF THE PREFERRED EMBODIMENTS

Figure 1:
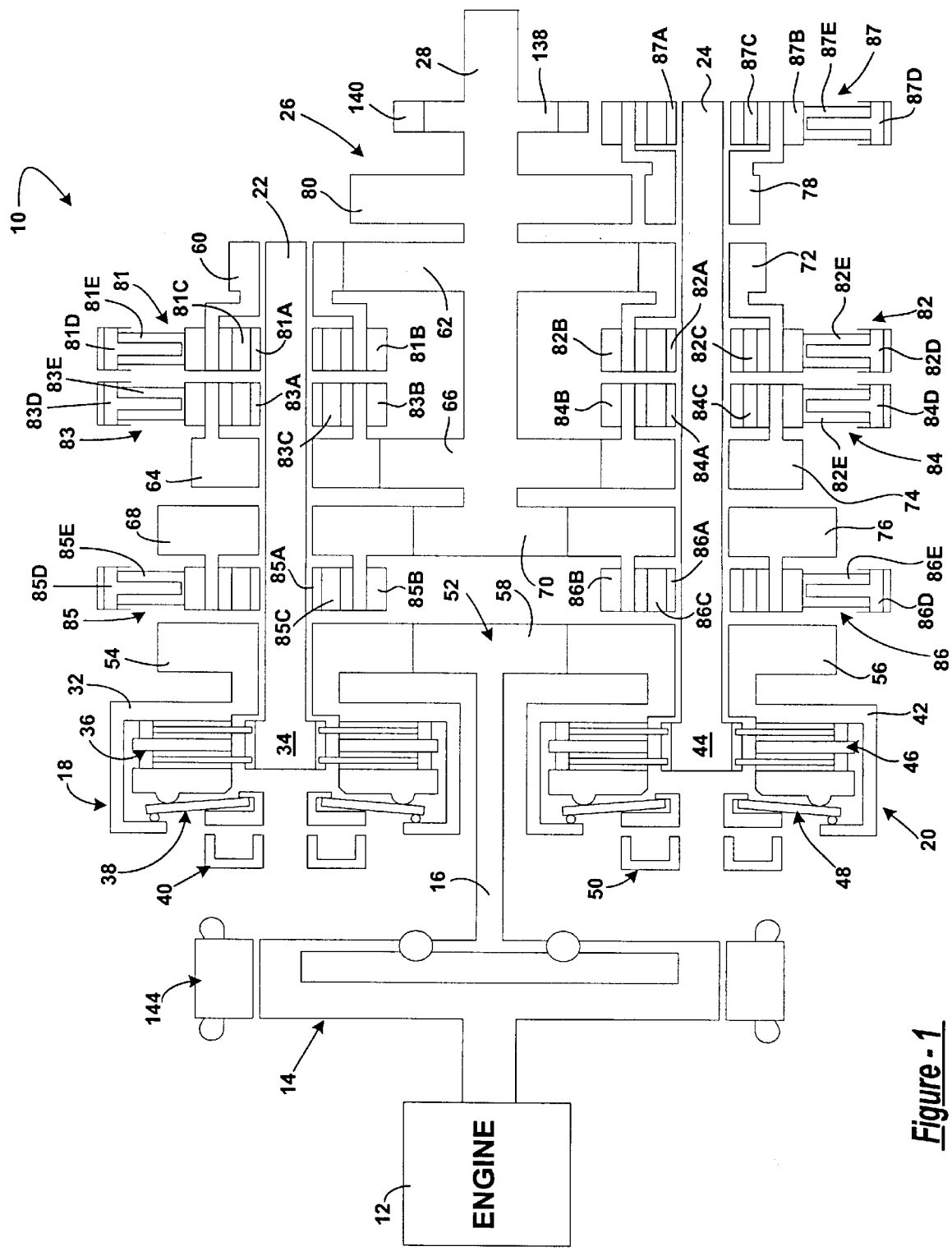
FIG. 1 is a schematic view of a twin-clutch dual-countershaft automated transmission according to the principles of the present invention.

With reference to the accompanying drawings, the components and function of a twin-clutch automated transmission 10 will now be described. Transmission 10 is driven by the output of an engine 12 and generally includes a flywheel damper unit 14, an input shaft 16, a first master clutch 18, a second master clutch 20, a first countershaft 22, a second countershaft 24, a geartrain 26, an output shaft 28, and a shift control system 30.

First master clutch 18 is a power-operated spring-apply plate-type clutch which is normally operable in its engaged state to establish a drive connection between input shaft 16 and first countershaft 22. Likewise, second master clutch 20 is a power-operated spring-apply plate-type clutch which is normally operable in its engaged state to establish a drive connection between input shaft 16 and second countershaft 24. First master clutch 18 includes a clutch drum 32, a hub 34 fixed to first countershaft 22, a clutch pack 36 disposed between drum 32 and hub 34, a spring-biased apply plate assembly 38 acting on clutch pack 36, and an actuator 40 for selectively releasing apply plate 38 from engagement with clutch pack 36. Preferably, actuator 40 is an electrically-actuated device, such as an electromagnectic solenoid, that controls the position of apply plate 38, and thus the magnitude of engagement of first master clutch 18, in response to electric power being provided thereto.

Second master clutch 20 included a clutch drum 42, a hub 44 fixed to second countershaft 24, a clutch pack 46 disposed between drum 42 and hub 44, a spring-biased apply plate assembly 48 acting on clutch pack 46, and an actuator 50 for selectively releasing apply plate 48 from engagement with clutch pack 46. Actuator 50 is an electrically-actuated device that controls the position of apply plate assembly 48, and thus the magnitude of engagement of second master clutch 20, in response to the electric power provided thereto. As will be detailed, shift control system 30 is operable to control actuators 40 and 50 and, in turn, the engagement and release of master clutches 18 and 20.

Geartrain 26 includes a headset 52 for transferring drive torque from input shaft 16 to master clutches 18 and 20. In particular, headset 52 includes a first transfer gear 54 rotatably supported on first countershaft 22, a second transfer gear 56 rotatably supported on second countershaft 24, and an input gear 58 fixed for rotation with input shaft 16 which is in meshed engagement with first transfer gear 54 and second transfer gear 56. As seen, first transfer gear 54 is fixed to clutch drum 32 for delivering engine power to first engine clutch 18 while second transfer gear 56 is fixed to clutch drum 42 for delivering engine power to second engine clutch 20. Gearset 26 also includes a first set of speed gears rotatably supported on first countershaft 22 and a second set of speed gears rotatably supported on second countershaft 24, both of which are in constant mesh with a set of output gears fixed to output shaft 28. The first set of speed gears include a first speed gear 60 which is meshed with a first output gear 62, a third speed gear 64 which is meshed with a second output gear 66, and a fifth speed gear 68 which is meshed with a third output gear 70. Similarly, the second set of speed gears includes a second speed gear 72 which is meshed with first output gear 62, a fourth speed gear 74 which is meshed with second output gear 66, and a sixth speed gear 76 which is meshed with third output gear 70. Geartrain 26 also includes a reverse gearset having a reverse input gear 78 rotatably supported on second countershaft 24, a reverse output gear 80 fixed to output shaft 28, and a reverse idler gear (not shown) meshed with reverse input gear 78 and reverse output gear 80.

Shift control system 30 includes a plurality of power-operated shift clutches which are operable for selectively coupling a selected speed gear to its corresponding countershaft for establishing six forward and one reverse speed ratio drive connections with output shaft 28. According to the present invention, these shift clutches are dual-mode "controllable" overrunning clutches. The term "controllable" is used to define the dual mode function of each clutch wherein operation in a "locked" mode results in a bi-directional clutching action and operation in a "released" mode permits freewheeling in both directions. In particular, a first overrunning clutch 81 is operable for selectively coupling first speed gear 60 to first countershaft 22, a second overrunning clutch 82 is operable for selectively coupling second speed gear 72 to second countershaft 24, and a third overrunning clutch 83 is operable for selectively coupling third speed gear 64 to first countershaft 22. Shift control system 30 also include a fourth overrunning clutch 84 that is operable for selectively coupling fourth speed gear 74 to second countershaft 24, a fifth overrunning clutch 85 operable for selectively coupling fifth speed gear 68 to first countershaft 22, a sixth overrunning clutch 86 operable for selectively coupling sixth speed gear 76 to second countershaft 24, and a seventh overrunning clutch 87 operable for selectively coupling reverse input gear 78 to second countershaft 24.

Figure 2:
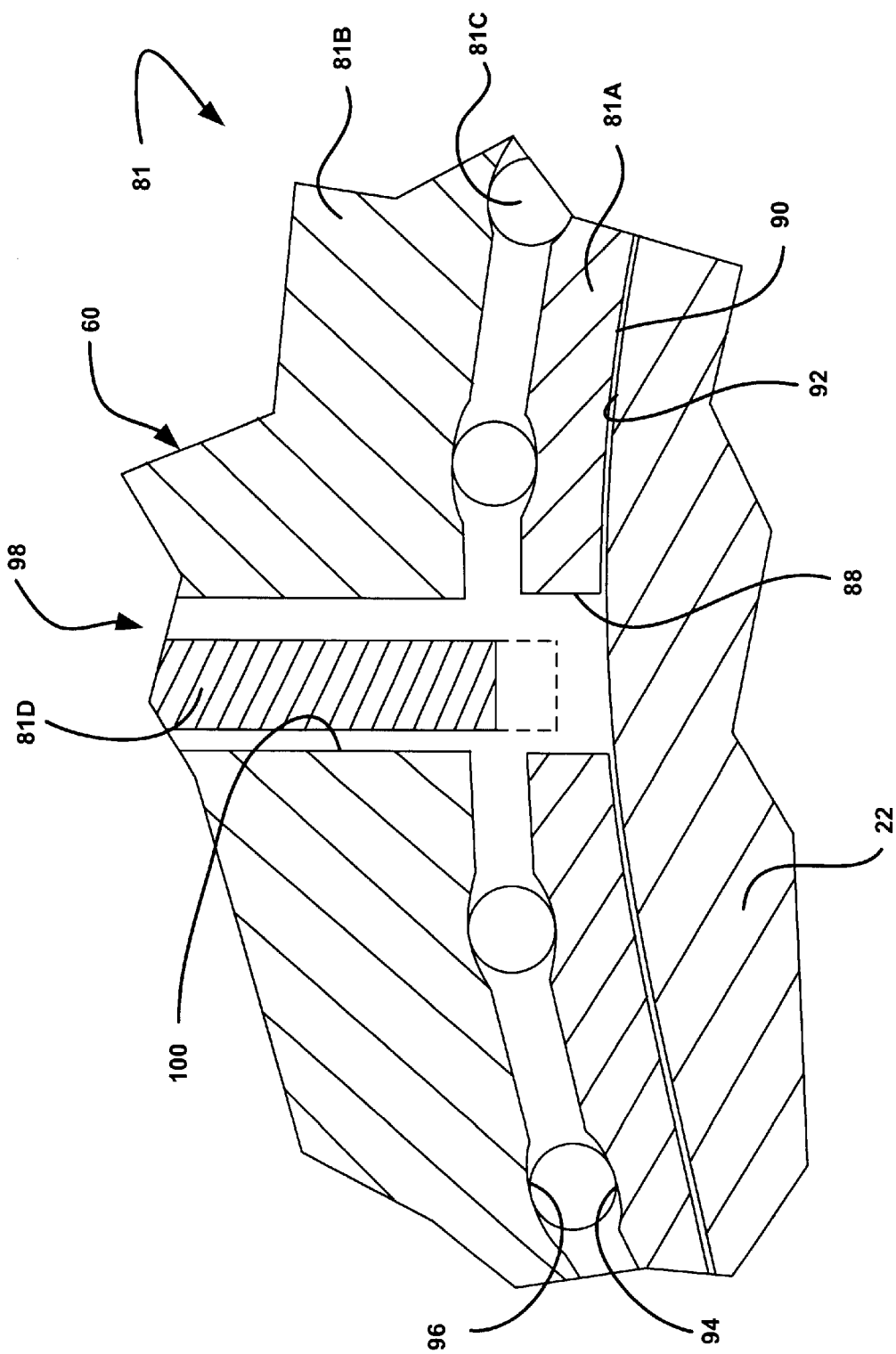
FIG. 2 is a partial sectional view of one of the controllable overrunning clutch assembly associated with the transmission shown in FIG. 1.

Referring to FIG. 2, the components of first controllable overrunning clutch 81 are shown in detail with the understanding that the second through seventh overrunning clutches 82–87 have similar structure and function. First overrunning clutch 81 is shown to include an inner ring 81A, an outer ring 81B, and a plurality of locking elements 81C disposed therebetween. Inner ring 81A is a C-shaped split ring which define a slot 88. Inner ring 81A has an inner cylindrical surface 90 which is supported on outer cylindrical surface 92 of first countershaft 22. Outer ring 81B is fixed to first speed gear 60 for common rotation. A series of complementary arcuate locking surfaces 94 and 96 are respectively formed in the outer cylindrical surface of inner ring 81A and the inner cylindrical surface of outer ring 81B and which are alignable to define roller pockets. Preferably, locking elements 81C are rollers that are disposed in the roller pockets.

First overrunning clutch 81 also includes a mode shift mechanism 98 which can be selectively actuated to shift first overrunning clutch 81 between its locked and released modes. With first overrunning clutch 81 in its locked mode, it acts as a self-locking clutch to prevent relative rotation between first speed gear 60 and first countershaft 22 in either direction, thereby coupling first speed gear 60 to first countershaft 22. In contrast, first overrunning clutch 81 functions in its released mode to permit bi-directional relative rotation between first speed gear 60 and first countershaft 22.

Mode shift mechanism 98 basically functions to control relative movement between inner ring 81A and outer ring 81B. In the embodiment shown, mode shift mechanism 98 includes a pin 81D extending through a radial aperture 100 formed in outer ring 81B and a spring 81E located between outer ring 81B and a head segment of pin 81D. Spring 81E functions to normally bias pin 81D in a radially outward direction to a first position (shown by solid line in FIG. 2) whereat the terminal end of pin 81D is disengaged from slot 88 in inner ring 81A. With pin 81D in its first position, first overrunning clutch 81 functions in its locked mode. That is, rotation of inner ring 81A relative to outer ring 81B in either direction causes rollers 81C to ride up and engage opposed locking surfaces 94 and 96, frictionally clamping inner ring 81A to first counter shaft 22. As a result, outer ring 81B is clutched to inner ring 81A via rollers 81C such that first speed gear 60 is coupled to first countershaft 22. The ability of inner ring 81A to index circumferencially in either direction relative to outer ring 81B causes locking of first speed gear 60 to first countershaft 22 regardless of the direction of relative rotation to accommodate both drive and coast conditions.

When it is desired to shift first overrunning clutch 81 from its locked mode into its released mode, pin 81D is moved in an inward direction from its first position to a second position, in opposition to the biasing of spring 81E. With pin 81D in its second position, its terminal end is positioned within slot 88 of inner ring 81D so as to locate and maintain inner ring 81A in a centered position relative to outer ring 81B. As such, inner ring 81A is prevented from indexing relative to outer ring 81B in either direction such that rollers 81C are centered in the roller pockets. With follers 81C centered in the roller pockets, inner ring 81A is released from clamped engagement with first countershaft 22 so as to permit bi-directional relative rotation between first countershaft 22 and first speed gear 60. Accordingly, overrunning clutch 81 is operable in its released mode to permit freewheeling in both directions.

Figure 3:
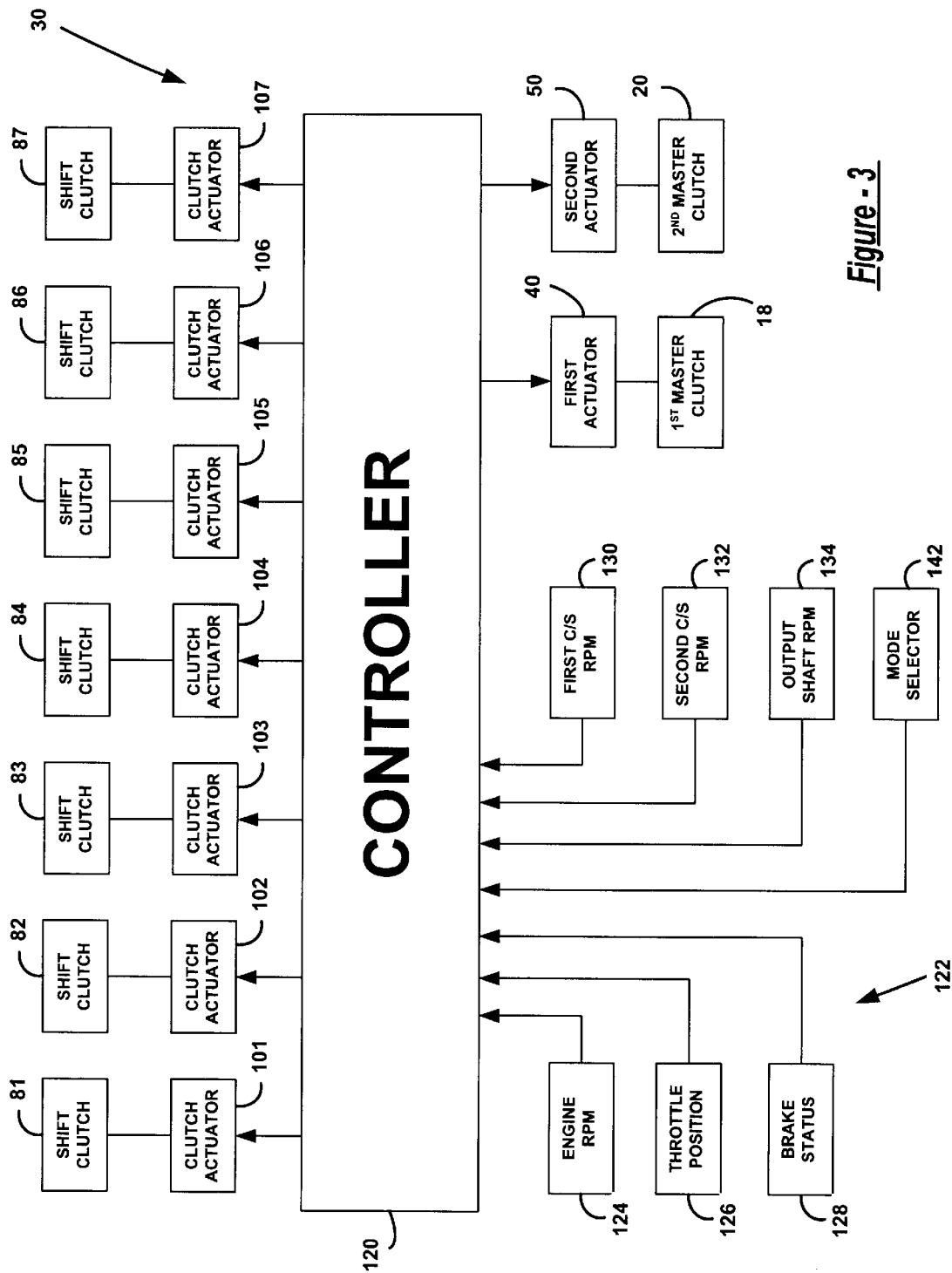
FIG. 3 is a diagrammatical illustration of the transmission control system adapted for use with the twin-clutch automated transmission shown in FIG. 1.

To provide a means for moving pin 81D between its first and second positions for shifting first overrunning clutch 81 between its locked and released modes, shift control system 30 includes a power-operated actuator 101. Clutch actuator 101 is an electrically-activated device operable for moving pin 81D in response to an electric control signal. Preferably, clutch actuator 101 functions in a power-off condition to hold pin 81D in its second position and is shifted into a power on condition in response to the electric control signal for permitting spring 81E to forcibly urge pin 81D to its first position. To this end, clutch actuator 101 can be any suitable two-position device, such as a solenoid operator. As will be understood, the remaining second through seventh controllable overrunning clutches 82 through 87 are substantially identical in structure and function to that described for first overrunning clutch 81. Thus, common suffixes are used with corresponding reference numerals to identify similar components. Moreover, power-operated clutch actuators are schematically shown in FIG. 3 for overrunning shift clutches 82 through 87 and are designated by corresponding reference numerals 102 through 107. Power-operated clutch actuators 102 through 107 are substantially similar in function to that of clutch actuator 101.

With continued reference to FIG. 3, shift control system further includes a transmission controller 120 and a group of vehicle sensors 122. Controller 120 is an electronically-controlled unit capable of receiving data from vehicle sensors 122 and generating electric output signals in response to the sensor signals. While not specifically limited thereto, sensors 122 include engine speed 124, throttle position 126, brake status 128, a first countershaft speed 130, a second countershaft speed 132, and an output shaft speed 134. Controller 120 functions to coordinate and monitor actuation of all the electrically-controlled devices associated with transmission 10 to permit powershifted sequential gear changes automatically without any input from the vehicle operator.

Geartrain 26 is shown in FIG. 1 to further include a parking pawl wheel 138 that is fixed to output shaft 28 and a parking pawl 140 that is operable to engage wheel 138 for releasably locking output shaft 28 to a stationary member (i.e. the housing of transmission 10) to prevent rotation of output shaft 28. Parking pawl 140 is operable to release output shaft 28 when the gearshift lever is moved out of its PARK position and lock output shaft 28 when the gearshift lever is returned to its PARK position.

If desired, a manually-operable mode selector switch 142 can be provided to shift transmission 10 from its automatic shift mode to a manual shift mode. Mode switch 142 would, when actuated, allow the vehicle operator to shift the gearshift lever manually to effect sequential gear shifts (without use of a clutch pedal). However, controller 120 would only permit the selected gearshift to be completed if the current vehicle characteristics (i.e. engine speed, vehicle speed, etc.) permit completion of the requested shift.

When it is desired to operate the vehicle, engine 12 is started with the gearshift lever in its PARK position and both master clutches 18 and 20 engaged such that both countershafts 22 and 24 are in drive connection with the output of engine 12. However, all of the electrically-actuated overrunning clutches are released, whereby no drive torque is delivered through geartrain 26 to output shaft 28. When the vehicle operator moves the gearshift lever from the PARK position to the DRIVE position, parking pawl 140 is released and first master clutch 18 is also released. In particular, controller 120 actuates first actuator 40 for releasing first master clutch 18, whereby the drive connection between input shaft 16 and first countershaft 22 is released. Controller 120 then actuates clutch actuator 101 for shifting first overrunning clutch 81 into its locked mode so as to couple first speed gear 60 to first countershaft 22, whereby the first forward speed ratio drive connection is established between first countershaft 22 and output shaft 28. Controller 120 then progressively engages first master clutch 18 for coupling input shaft 16 to first countershaft 22, thereby accelerating the vehicle.

Thereafter, when the vehicle operating parameters indicate a need to shift transmission 10 into the second forward gear ratio, controller 120 actuates second actuator 50 for releasing second master clutch 20, whereby the drive connection between engine 12 and second countershaft 24 is released. Controller 106 then activates clutch actuator 102 for shifting second overrunning clutch 82 into its locked mode such that second speed gear 72 is coupled to second countershaft 24. Thereafter, controller 120 coordinates the release of first master clutch 18 and the re-engagement of second master clutch 20. Once first master clutch 18 is released completely, controller 120 causes actuator 101 to shift first overrunning clutch 81 into its released mode, thereby uncoupling first speed gear 60 from first countershaft 22.

As will be appreciated, this upshift process continues through each of the other forward speed gear ratios and likewise works in reverse for downshifts so as to establish six forward gear ratios. When the gearshift lever is shifted into its REVERSE position, clutch actuator 107 is activated by controller 120 for shifting seventh overrunning clutch 87 into its locked mode to couple reverse gear 78 to second countershaft 24 for driving output shaft 28 in the opposite direction. With this powershift methodology, transmission 10 shifts between master clutches in a power-on shift strategy (i.e. no power interruption). Transmission 10 is also shown to include a motor/generator 144 associated with flywheel damper unit 14 and controlled by controller 120 for starting engine 12 and charging the battery.

The shiftable overrunning clutches described above can utilize alternative mode shift systems in place of the spring-biased pin mechanism for controlling shifting between locked and released modes. In particular, pivotable toggles or friction bands can be used to control relative movement between the inner and outer rings of each overrunning clutch. Non-limiting examples of multi-mode shiftable clutches that can be used in substitution for the overrunning clutches previously disclosed are shown in U.S. Pat. No. 6,068,097 and European Application No. EP0945637. Moreover, a coordinated shift system comprised of a rail for each countershaft with cams for moving the pins between the first and second positions can be employed. Each shift rail would be moveable to various positions by an electric actuator for causing a coordinated actuation and release of the overrunning clutches to establish the desired sequential gearshifts.

Thus, the transmission of the present invention utilizes the components typically associated with a manually-shifted synchromesh transmission in combination with shiftable overrunning clutches and a twin clutch dual-countershaft arrangement to provide a compact powershifted automated multi-speed transmission. The use of a compact geartrain allows a desired speed gear to be pre-selected and engaged while disconnected from the engine and thereafter driven by shifting between the master clutches. Moreover, the use of all electric powered actuators for the master clutches and shift clutches eliminates the need for a hydraulic system and should promote a highly efficient transmission since electric power is only required for shifting.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A twin-clutch transmission comprising:
   an input shaft;
   an output shaft having first and second output gears fixed thereto;

a first countershaft rotatably supporting a first speed gear meshed with one of said first and second output gears;

a first master clutch for selectively establishing a releasable drive connection between said input shaft and said first countershaft;

a first overrunning clutch operable in a locked mode for coupling said first speed gear to said first countershaft and in a released mode for releasing said first speed gear from engagement with said first countershaft;

a first shift actuator for shifting said first overrunning clutch between its locked and released modes;

a second countershaft rotatably supporting a second speed gear meshed with one of said first and second output gear;

a second overrunning clutch operable in a locked mode for coupling said second speed gear to said second countershaft and in a released mode for releasing said second speed gear from engagement with said second countershaft;

a second shift actuator for shifting said second overrunning clutch between its locked and released modes; and a control system for controlling actuation of said first and second actuators.

2. The twin-clutch transmission of claim 1 wherein said first overrunning clutch comprises:

a first inner ring rotatably supported on said first countershaft and having a pair of end segments defining a slot therebetween;

a first outer ring fixed to said first speed gear;

a set of first locking elements disposed in pockets formed between said first inner ring and said first outer ring; and a first mode shift mechanism operable in first position to permit relative rotation between said first inner and outer rings and in a second position to prevent such relative rotation, whereby said first overrunning clutch operates in its locked mode when said first mode shift mechanism is in its first position and operating in its released mode when said first mode shift mechanism is in its second position.

3. The twin-clutch transmission of claim 2 wherein said first shift actuator is a power-operated device operable for moving said first mode shift mechanism between its first and second positions.

4. The twin-clutch transmission of claim 3 wherein said second overrunning clutch comprises:

a second inner ring rotatably supported on said second countershaft and having a pair of end segments defining a slot therebetween;

a second outer ring fixed to said second speed gear;

a set of second locking elements disposed in pockets formed between said second inner ring and said second outer ring; and a second mode shift mechanism operable in a first position to permit relative rotation between said second inner and outer rings and in a second position to prevent such relative rotation, whereby said second overrunning clutch operates in its locked mode when said second mode shift mechanism is in its first position and operating in its released mode when said mode shift mechanism is in its second position.

5. The twin-clutch transmission of claim 4 wherein said second shift actuator is a power-operated device operable for moving said second mode shift mechanism between its first and second positions.

6. The twin-clutch transmission of claim 5 wherein said control system includes a controller operable for generating electric control signals that are supplied to said first and second shift actuators for controlling actuation thereof.

7. The twin-clutch transmission of claim 1 further comprising:

a first electric actuator controlling activation of said first master clutch; and a second electric actuator controlling actuation of said second master clutch.

8. The twin-clutch transmission of claim 1 wherein said first and second speed gears are both meshed with said first output gear.

9. The twin-clutch transmission of claim 1 further including a first mode shift mechanism for shifting said first overrunning clutch between its locked and released modes, and wherein said first shift actuator is a first electrically-actuated actuator controlling said first mode shift mechanism.

10. The twin-clutch transmission of claim 1 further including a second mode shift mechanism for shifting said second overrunning clutch between its locked and released modes, wherein said second shift actuator is a second electrically-actuated actuator controlling said second mode shift mechanism, and wherein said control system includes a controller operable to generate electric control signals for coordinated actuation of said first and second actuators.

11. A transmission comprising:

an input shaft;

an output shaft having an output gear fixed thereto;

a countershaft rotatably supporting a speed gear meshed with said output gear;

a master clutch for selectively establishing a releasable drive connection between said input shaft and said countershaft;

an overrunning clutch including a first ring supported on said countershaft, a second ring fixed to said speed gear, locking elements disposed in pockets formed between said first and second rings, and a shift member moveable between first and second positions, said shift member operable in its first position to permit relative rotation between said first and second rings for causing said locking elements to engage locking surfaces of said pockets for coupling said first ring to said countershaft such that said speed gear is coupled for rotation with said countershaft, said shift member is operable in its second position to prevent relative rotation between said first and second rings such that said speed gear is released from engagement with said countershaft.

an electric actuator for controlling movement of said shift member between its first and second positions; and a controller for generating an electric control signal and sending said control signal to said actuator.

12. The transmission of claim 11 further comprising a second electric actuator receiving electric control signals from said controller for controlling actuation of said master clutch.

13. The transmission of claim 12 wherein said master clutch includes a clutch pack operable interconnected between said input shaft and said countershaft and a spring-biased apply plate normally operable to engage said clutch pack and establish a drive connection between said input shaft and said countershaft, and wherein said second electric actuator is arranged to displace said apply plate from engagement with said clutch pack to release said countershaft from driven connection with said input shaft.

14. The transmission of claim 11 further comprising a second countershaft rotatably supporting a second speed gear;

a second master clutch for selectively establishing a releasable drive connection between said input shaft and said second countershaft;

a second overrunning clutch including a third ring supported on said second countershaft, a fourth ring fixed to said second speed gear, a set of second locking elements disposed in pockets formed between said third and fourth rings, and a second shift member moveable between first and second positions, said second shift member operable in its first position to permit relative rotation between said third and fourth rings for causing said second locking elements to engage locking surfaces of said pockets for coupling said third ring to said second countershaft such that said second speed gear is coupled for rotation with said second countershaft, said second shift member is operable in its second position to prevent relative rotation between said third and fourth rings such that said second speed gear is released from engagement with said second countershaft; and a second electric actuator controlled by said controller for moving said second shift member between its first and second positions.

15. The transmission of claim 11 further comprising a third electric actuator receiving electric control signals from said controller for controlling said first master clutch, and a fourth electric actuator receiving electric control signals from said controller for controlling said second master clutch.

16. The transmission of claim 14 wherein said second speed gear is meshed with a second output gear fixed to said output shaft.

17. The transmission of claim 14 wherein said second speed gear is meshed with said output gear.

\* \* \* \* \*